UNITED STATES PATENT OFFICE 2,574,446

CATALYTIC DESULFURIZATION OF GAS OIL-KEROSENE MIXTURES

Patrick Docksey and Frederick William Bertram Porter, Sunbury on Thames, England, assignors to Anglo-Iranian Oil Company Limited, London, England, a British joint-stock corporation No Drawing. Application December 30, 1948, Serial No. 68,416. In Great Britain December 16, 1947

4 Claims. (Cl. 196—28)

The invention relates to the catalytic desulphurisation of petroleum distillates.

It is known to desulphurise petroleum distillates by passing them in admixture with hydrogen over a sulphur resistant hydrogenation catalyst at elevated temperature and elevated pressure whereby organic sulphur compounds present in the distillates are hydrogenated to form hydrogen sulphide which can readily be removed from the treated distillates. The process as normally carried out involves a net consumption of hydrogen and the cost of supplying the hydrogen is a major factor in the economics of the process. Furthermore, in order to secure the necessary partial pressure of hydrogen, it has generally been considered necessary to operate at elevated pressure ranging from 500–1000 lb./sq. in. or more, and a plant to withstand such pressures has to be made from special steels which are comparatively expensive.

It is well known that the hydroforming process effects considerable desulphurisation and at the same time produces a hydrogen-rich gas mainly by dehydrogenation of the naphtenes present. This process, however, is applicable to a very limited class of feedstock and does not constitute an economic desulphurisation process in view of the fact that the reaction conditions are so severe that the catalyst has a very short active life, and needs to be regenerated at short intervals (for example, of six hours), while the increased production of aromatics is in many cases undesirable.

The invention has among its objects to provide a process for the catalytic desulphurisation of petroleum distillates which can be carried out without the use of hydrogen added from an external source. It is also an object of the invention to enable such a process to be carried out at pressures low enough to avoid the use of special pressure resisting steels, thereby reducing the cost of the plant. Yet another object of the invention is to provide a process which is applicable to petroleum distillates of camparatively wide boiling range whereby the individual treatment for the removal of sulphur of a number of fractions of narrow boiling range is rendered unnecessary, with the result that the operations in the refinery, necessary to secure high quality products from crude petroleum, are considerably simplified.

It has now been found that by careful control of the reaction conditions and that by selecting a suitable catalyst, it is possible to effect desulphurisation of petroleum distillates without adding hydrogen from an external source, the hydrogen necessary for the conversion of the sulphur in the feedstock into hydrogen sulphide being derived from the feedstock itself. It has also been found that by careful control of the reaction conditions it is possible to secure a very long catalyst life with the necessity for only occasional regenerations, while maintaining a high degree of desulphurisation.

According to the invention, the desulphurisation of a naphthene-containing petroleum distillate boiling up to the end of the gas oil range is effected by vapourising the distillate and passing it in admixture with hydrogen over a catalyst which combines activity for dehydrogenation of naphthene molecules to aromatics, with activity for the conversion of organically combined sulphur to hydrogen sulphide, and which is not poisoned as a catalyst by the presence of sulphur compounds, at a temperature and pressure sufficient to effect the conversion of a considerable proportion of the sulphur contained in the distillate into hydrogen sulphide, and to produce a hydrogen-rich gas mixture which is separated from the treated feedstock and recycled to the reaction zone at a rate sufficient to maintain the necessary partial pressure of hydrogen therein.

The invention may be applied with advantage to a petroleum distillate comprising the kerosene and gas oil fractions and to a petroleum distillate comprising the naphtha, kerosene and gas oil fractions. In each case, the treated distillate may be fractionated by distillation into the respective fractions of greatly reduced sulphur content.

It is believed that the reaction proceeds by dehydrogenation of some of the naphthenes to produce hydrogen in excess of that required to convert the combined sulphur present into hydrogen sulphide, and the reaction conditions for any particular feedstock must therefore be determined having regard to any limiting conditions imposed by these two reactions. Thus, there is a lower temperature of about 700° F. below which little dehydrogenation would occur and below which the reaction would not be self-supporting in hydrogen.

This lower temperature depends to some extent on the sulphur content and the higher the sulphur content, the higher the minimum temperature necessary to provide sufficient hydrogen. At temperatures above about 800° F., dehydrogenation occurs to such an extent that the product becomes increasingly aromatic. Furthermore, at temperatures above 800° F. the on-stream time is reduced. The preferred temperature of operation is to some extent dependent upon the pressure employed which is preferably between 50 and 250 lb./sq. in. As the pressure is increased, the minimum temperature at which satisfactory dehydrogenation of the naphthenes can be obtained increases, and if at a fixed temperature the pressure is sufficiently increased, the reverse reaction of hydrogenation of aromatics begins to occur. Thus, when operating at the higher pressures it is preferable to use higher temperature. Similarly it is desirable to avoid the combination of high temperature and low pressure since such conditions lead to a short on-stream time for satisfactory operation. By operating under the optimum conditions, on-stream times of 300 to 400 hours before regeneration are possible.

The space velocity may be varied according to the degree of desulphurisation required and the activity of the catalyst, but space velocities above 10 v./v./hr. result in a low degree of desulphurisation.

Operating under the conditions above described, the gases separated by cooling the treated fraction at reaction pressure contain 70-80% by volume of hydrogen and are continuously recycled to the reaction zone. It has been found that the hydrogen sulphide content of the separated gas builds up to an equilibrium concentration after which the gases may be recycled to the reaction zone without further increase in the content of hydrogen sulphide which is thereafter dissolved in the product until such time as it is depressurised. If desired, however, the hydrogen sulphide may be removed from the gas by any of the usual methods and the hydrogen sulphide-free gas recycled to the reaction zone. The gas may be submitted to treatment in known manner for increasing the relative proportion of hydrogen therein, as by passage through an oil tower. It is not necessary to supply extraneous hydrogen to the reaction zone when starting the process as the gases separated from the treated fraction may be allowed to build up to form the recycle gas.

Among the catalysts that may be used are metal sulphides and oxides especially those of the 6th group, either alone (for example chromium oxide and tungsten sulphide) or in admixture with other sulphide or oxides (for example, pellets consisting of two parts tungsten sulphide and one part nickel sulphide) or in combination with other oxides or sulphides (for example, cobalt molybdate or thiomolybdate) or mixed with, or deposited on, a porous support such as natural or processed bauxite, activated alumina and kieselguhr. Natural and processed bauxite may themselves be used as catalysts. The preferred catalyst consists of cobalt molybdate supported on alumina.

An effective pelleted catalyst was prepared by mixing powdered cobalt oxide, molybdic oxide and alumina, and pelleting with 1% graphite into $\frac{1}{16}''$ pellets which were then treated for two hours at 550° C. The catalyst may also be prepared by extrusion.

An effective cobalt molybdate type catalyst was prepared by the impregnation of roasted Indian bauxite with cobalt molybdate solution, so that the molybdenum content of the material stable at 1000° F. was 3.6% by weight, while the cobalt content of the material stable at 1000° F. was 1.0% weight.

The following are examples of the process of the invention.

EXAMPLE I

A mixture of unrefined Iranian kerosene and Iranian gas oil in the ratio of 14:8 by volume was passed at a temperature of 780° F. and a pressure of 100 lb./sq. in. over a supported cobalt molybdate catalyst prepared by precipitating cobalt molybdate in the presence of a suspension of undried alumina gel and roasting at a temperature not exceeding 700° C. The space velocity was maintained at 1 v./v./hr. and the process was continued for a period of 249 hours during which time there was a gas make of 25 cubic feet per barrel. This gas contained 80% hydrogen and was recycled to the reaction zone at the rate of 4000 cubic feet per barrel.

The treated mixture was then fractionated by distillation in the usual manner into a kerosene fraction and a gas oil fraction. The respective properties of the unrefined and treated fractions are set out in Table 1, following:

Table 1

|  | Kerosene | | Gas Oil | |
|---|---|---|---|---|
|  | Feed | Product | Feed | Product |
| S. G. | .7940 | .7915 | .853 | .845 |
| I. B. P., ° C. | 159.5 | 161.5 | 251 | 265.5 |
| 10%, ° C. | 175 | 176 | 272 | 270 |
| 50%, ° C. | 198 | 194 | 295 | 286 |
| F. B. P., ° C. | 246 | 233 | 352 | 343 |
| Sulphur, weight per cent. | 0.128 | 0.003 | 0.99 | 0.12 |
| Sulphur removal, per cent. |  | 98 |  | 88 |
| Aromatics, weight per cent. | 18.4 | 20.0 |  |  |
| Aniline Pt.: |  |  |  |  |
| (1) ° C. | 60.9 | 58.5 |  |  |
| (2) ° C. | 76.0 | 75.2 |  |  |
| Bromine Number | 1 | 2 |  |  |
| Corrosion Cu Strip |  | No change |  |  |
| Colour Saybolt |  | +23 |  |  |
| Aniline Pt., ° C. |  |  | 72.6 | 71.9 |
| Diesel Index |  |  | 55 | 58 |

It will be noted that a very high degree of desulphurisation was effected in respect of each fraction and that the aromatic content of the kerosene was slightly increased indicating that there had probably been dehydrogenation of naphthenes to aromatics which would account for the production of the hydrogen necessary to convert the sulphur into hydrogen sulphide. Also, the diesel index of the gas oil was somewhat improved.

EXAMPLE II

A fraction from an Iranian crude oil boiling approximately in the range 100-300° C. and comprising substantially the heavy naphtha, kerosene and gas oil fractions was passed at a space velocity of 3 v./v./hr. over a supported cobalt molybdate catalyst prepared as described in Example I at a temperature of 780° F. and a pressure of 110 lb./sq. in. The process was continued for a period of 203 hours during which time the gas make amounted to 5 cubic feet per barrel. This gas contained 80% hydrogen and was recycled to the reaction zone at a rate of 2700 cubic feet per barrel of feedstock. The hydrogen sulphide content of this recycled gas increased until an equilibrium figure of 2.5% by volume was reached.

The sulphur content of the feedstock was 0.387% by weight while the sulphur content of the treated distillate was 0.05% by weight, that is to say the sulphur removal amounted to 87% by weight.

The hydrogen sulphide together with some of the lighter hydrocarbons was removed from the treated distillate by flashing and the distillate was then separated into a light fraction boiling up to 180° C., a medium fraction boiling between 180° C. and 250° C. and a heavy fraction boiling above 250° C. The properties of the treated fractions are set out in the following table, numbered 2.

Table 2

|  | Fraction | | |
|---|---|---|---|
|  | I. B. P., 180° C. | 180° C. to 250° C. | >250° C. |
| Wt. per cent on product | 38.23 | 37.71 | 24.06 |
| S. G. | 0.76 | 0.81 | 0.85 |
| I. B. P., °C | 95 | 193 | 230 |
| 10%, °C | 114 | 202 | 276 |
| 50%, °C | 137.5 | 214 | 290 |
| F. B. P., °C | 178.5 | 243 | 327 |
| Sulphur, weight per cent | 0.002 | 0.018 | 0.181 |
| Doctor test | Neg. | Neg. |  |
| Bromine Number | 3 | 2 |  |
| Aniline Pts.: |  |  |  |
| (1) °C | 51.4 | 64.9 |  |
| (2) °C | 66.6 | 78.4 |  |
| Aromatics, weight per cent | 16.3 | 16.3 |  |
| Colour Saybolt | >+30 | >+30 |  |
| Aniline Pt., °C |  |  | 73.6 |
| Diesel Index |  |  | 59 |

We claim:
1. In a continuous process for the hydrocatalytic desulphurization of a straight run sulphur-and-naphthene-containing petroleum distillate consisting of a mixture of material boiling substantially within the gas oil range and material boiling substantially within the kerosene range, wherein the distillate is contacted in vapor form in a reaction zone at an elevated temperature and pressure in the presence of hydrogen with a dehydrogenation-hydrogenation catalyst which is immune to sulphur poisoning and combines activity for the dehydrogenation of naphthenes in said distillate to aromatics with activity for the hydrogenation of organically combined sulphur in the distillate to hydrogen sulphide, the method of operating the process so that it will be self-supporting with respect to the amount of hydrogen needed and produce a desulphurized distillate from which desulphurized distillate fractions may be recovered by a single distillation step, said desulphurized distillate having, except for lowered sulphur content, properties and boiling range substantially the same as the feedstock; comprising the steps of passing the distillate to be treated through said reaction zone and contacting the distillate therein with said catalyst and with hydrogen derived solely from the distillate, maintaining a selected temperature in said zone between about 700° F. to about 800° F. at which hydrogen is continuously produced from said distillate, maintaining a selected pressure in said zone between about 50 to about 250 lbs./sq. in. gauge, said selected temperature and pressure being correlated to provide, from the dehydrogenation of naphthenes contained in said distillate, a net production of hydrogen at least sufficient to convert organic sulphur compounds in said distillate to hydrogen sulphide and to maintain the selected pressure in said zone; separating a hydrogen-rich gas mixture from the treated distillate, recycling said hydrogen-rich gas mixture to the reaction zone to constitute the whole of the hydrogen supplied to said zone, the hydrogen recycle rate being sufficient to maintain the necessary partial pressure of hydrogen in said zone; and fractionating the desulphurized distillate for the separate recovery of a desulphurized distillate fraction boiling within the gas oil range and a desulphurized distillate fraction boiling within the naphtha/kerosene range.

2. A process in accordance with claim 1 wherein said distillate is passed to said reaction zone at a space velocity of less than 10 v./v./hr., wherein the selected temperature is approximately 780° F. and the selected pressure is approximately 100 lbs./sq. in. gauge, and wherein the hydrogen recycle rate is between about 2000 to about 4000 cu. ft./bbl. of feedstock.

3. A process in accordance with claim 1 where in said catalyst is of the cobalt molybdate-on-alumina type.

4. A process in accordance with claim 1 in which the desulphurized distillate is fractionated for the separate recovery of kerosene and gas oil fractions.

PATRICK DOCKSEY.
FREDERICK WILLIAM BERTRAM PORTER.

REFERENCES CITED

The following references are of record in the file of this patent:

UNITED STATES PATENTS

| Number | Name | Date |
|---|---|---|
| 2,253,308 | Rosen | Aug. 19, 1941 |
| 2,437,532 | Huffman | Mar. 9, 1948 |
| 2,445,345 | Byrns | July 20, 1948 |
| 2,486,361 | Nahin et al. | Oct. 25, 1949 |
| 2,498,559 | Layng et al. | Feb. 21, 1950 |
| 2,500,146 | Fleck et al. | Mar. 14, 1950 |
| 2,516,877 | Horne et al. | Aug. 1, 1950 |
| 2,522,065 | Short | Sept. 12, 1950 |